United States Patent
Lin

(10) Patent No.: US 6,747,763 B1
(45) Date of Patent: Jun. 8, 2004

(54) PAPER FEEDER FOR IMAGE READER

(75) Inventor: Shein-Chi Lin, Hsin-Chu (TW)

(73) Assignee: Avision Inc., Hsin-Chu (TW)

( * ) Notice: Subject to any disclaimer, the term of this patent is extended or adjusted under 35 U.S.C. 154(b) by 0 days.

(21) Appl. No.: 09/502,483

(22) Filed: Feb. 11, 2000

(30) Foreign Application Priority Data

Jun. 16, 1999 (TW) ...................................... 88110370 A

(51) Int. Cl.⁷ ................................................. H04M 1/04
(52) U.S. Cl. ...................... 358/474; 358/498; 358/496; 399/367
(58) Field of Search ................................. 358/498, 496, 358/400, 474, 493; 271/3.1, 186; 399/367

(56) References Cited

U.S. PATENT DOCUMENTS

| | | | | |
|---|---|---|---|---|
| 4,335,954 A | * | 6/1982 | Phelps | 355/14 |
| 4,593,323 A | * | 6/1986 | Kanda et al. | 358/256 |
| 4,764,807 A | * | 8/1988 | Kimura et al. | 358/75 |
| 4,774,591 A | * | 9/1988 | Matsunawa et al. | 358/285 |
| 4,843,431 A | * | 6/1989 | Horiguchi et al. | 355/34 |
| 5,157,521 A | * | 10/1992 | Chung | 358/498 |
| 5,734,483 A | * | 3/1998 | Itoh | 358/496 |
| 5,915,691 A | * | 6/1999 | Deguchi et al. | 271/265.01 |
| 6,069,715 A | * | 5/2000 | Wang | 358/498 |

OTHER PUBLICATIONS

Taiwan Patent 358619.
Taiwan Patent 322828.
U.S. Patent No. 5,157,521.

* cited by examiner

*Primary Examiner*—Kimberly Williams
*Assistant Examiner*—Negussie Worku
(74) *Attorney, Agent, or Firm*—Winston Hsu

(57) ABSTRACT

A pressure is exerted on a paper to flatten the paper being fed in the paper feeder for an image reader and to avoid distortion due to paper warping. The pressure is exerted along the line where the incident light is reflected from the paper.

4 Claims, 9 Drawing Sheets

PAPER FEEDER FOR IMAGE READER

BACKGROUND OF THE INVENTION (1) Field of the Invention

This invention is related to image reader, in particular to the paper feeder of the image reader.

(2) Description of the Related Art

An image reader is usually used in a scanner, a copier, a facsimile machine, etc. All these equipment contain an image reader. To increase the throughput, automatic document feeders (ADF) are customarily used.

FIG. 1 shows such an ADF, including a feeding roller 162 for picking up a sheet of paper 10 to be scanned, a taking up roller 164 to take up the paper 10 after scanning, an upper guide plate 12; a left lower guide plate 142; a central lower guide plate 144; a right lower guide plate 146. The three lower guide plates and the upper guide plate 12 form a curved conduit for the paper to move and to read the image. The bottom of the central guide plate 133 is transparent and is used to read the image at the bottom of the paper 10.

An light ray 152 is incident on the bottom side of the paper and is reflected as a ray 154 to an image sensor 18 for image processing.

FIG. 2 shows another common practice. The paper feeding roller 162, the take-up roller 164 and the upper paper guide 12 function in a similar way as in FIG. 1 for feeding the paper 10. However the lower paper guides 242, 244 and 246 form a unitary transparent arc.

Both the paper guides shown in FIG. 1 and FIG. 2 have a common drawback as shown in FIG. 3. Due to the finite distance between the upper paper guide 12 and the lower paper guide 144, the paper fed between these guides may wrap in the lateral direction orthogonal the direction of the paper feed. The warping may be due to warping of the paper, paper rubbing, air disturbance in the paper passage, or jittering of the rollers 162, 164 when the rollers are turn on and off.

FIG. 4 shows another cause of paper distortion when the paper 10 wrinkles along lines perpendicular to the direction of the paper movement between the upper guide plate 12 and the lower guide plate 144.

In FIG. 3 and FIG. 4, the image on the paper is read by means of the reflected light rays 1641, 1642 and 1643 incident on the image sensor 18, from which the image is processed. Due to paper, an original straight line on the image becomes crooked or distorted. Such a distorted reproduction is not satisfactory to high quality image reproduction.

High quality reproduction especially important for digital processing, such as pattern recognition, digital camera and digital drawings.

SUMMARY OF THE INVENTION

An object of this invention is to improve a paper feeder structure for high quality reproduction of a scanned paper. Another object of this invention is to avoid paper warping in a paper feeder.

These objects are achieved in this invention by putting pressure at the line where the incident light ray is reflected. By exerting pressure, the paper is flattened at the points of light incidence. The pressure may be exerted by a spring, a weight or a roller.

DETAILED DESCRIPTION OF THE INVENTION

Figure 5:
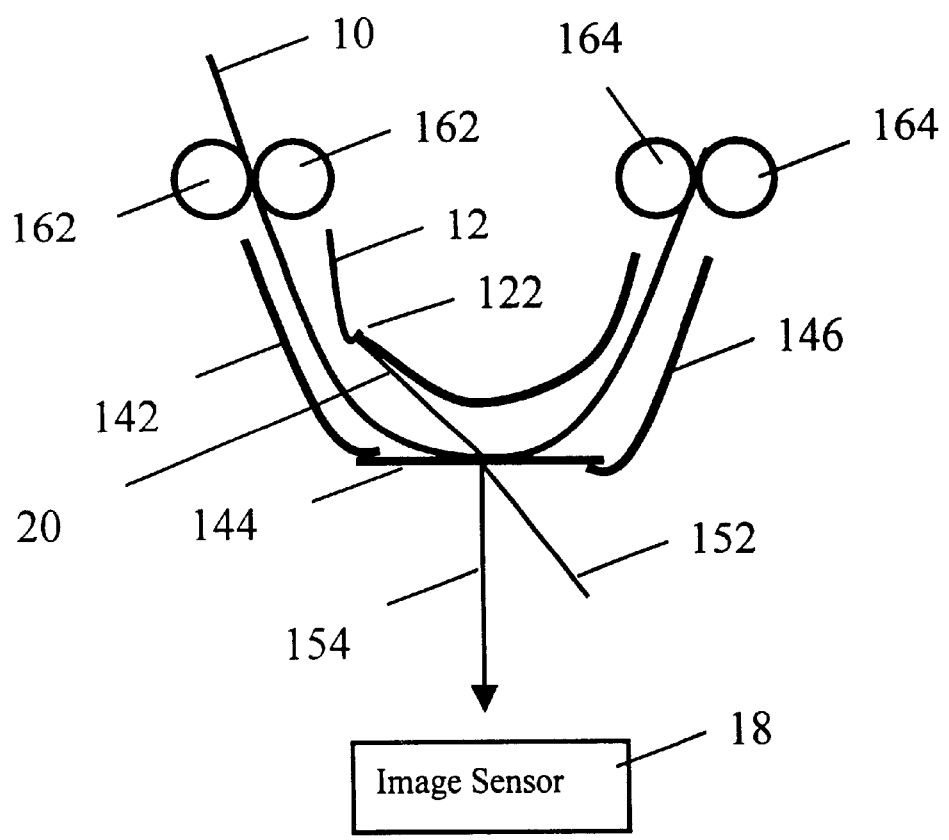
FIG. 5 shows a first embodiment of the present invention.

FIG. 5 shows a first embodiment of the present invention. All the parts with the same reference numerals as in FIG. 1 correspond to the same function. The difference is that at a point 122 at the upper guide plate 12 is attached a flat pressure spring 20. The end of this flat pressure spring 20 presses the paper 10 against the transparent window 144 of the lower center guide plate at the point where the incident light ray 152 is reflected as light ray 154, which sensitizes the image sensor 18.

Figure 6:
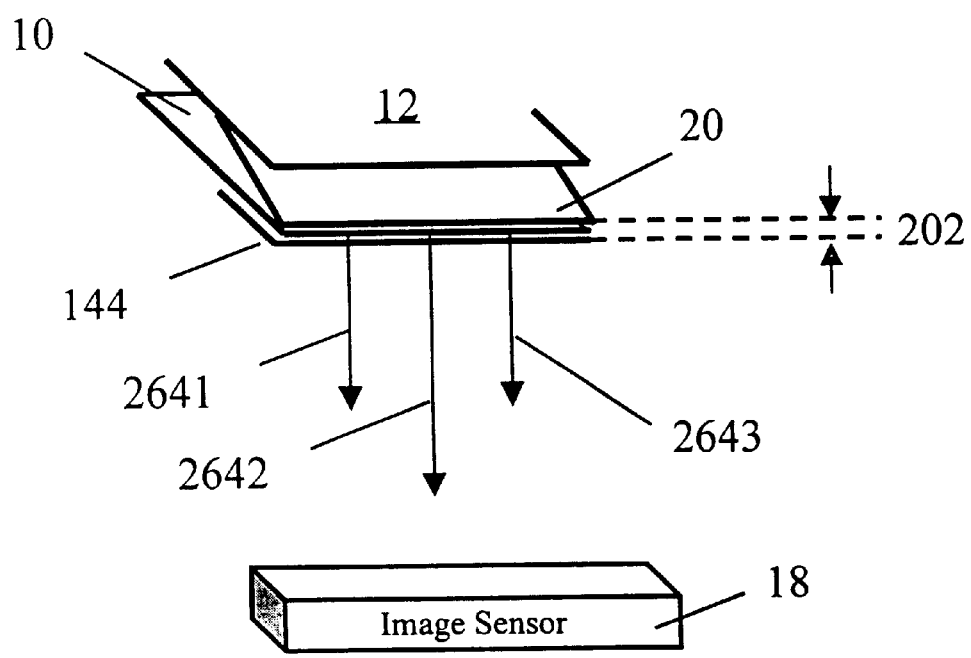
FIG. 6 shows how the paper is prevented from warping.

FIG. 6 show the front view of FIG. 5. The spring 20 presses against the paper at line 144. Because of this pressure, there is a tiny crevice 202 between the end of the flat spring 20 and the paper 10 is flattened. When a light ray is incident at this pressure line, the reflected light rays 2641, 2642 and 2643 are not distorted.

Figure 7:
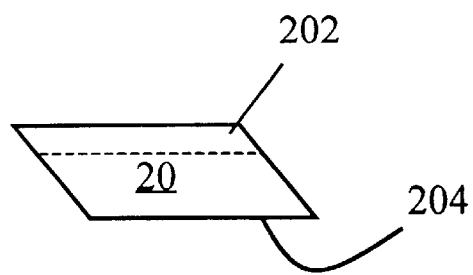
FIG. 7 shows a roller for flattening a paper.
Figure 7:
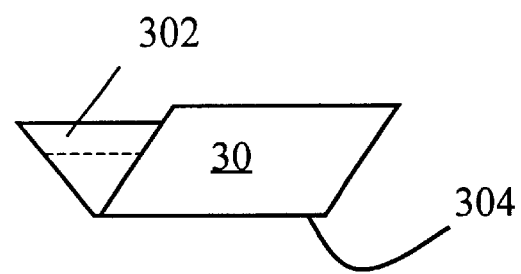
Figure 7:
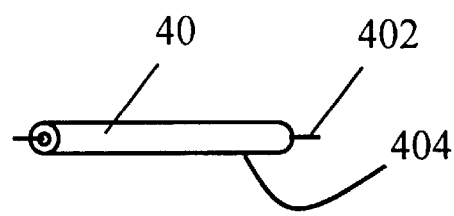
Figure 7:
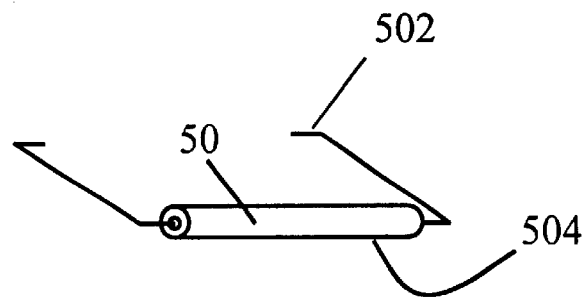

FIG. 7 shows different versions for exerting pressure for flattening the paper. In one version as shown in FIGS. 6 and 7, a pressure spring 20 is attached at one end to the upper guide plate 12 in FIG. 5 and the other end 204 presses against the paper where the paper is sensed. In a second version, the pressure spring 30 is attached at one end 302 to a upper guide plate 12 and is folded along line 304 so that the other end of the pressure spring has a large area of the flattened paper. In a third version A roller 40 is placed above the paper 10 at the point of light incidence 404. The roller 404 is hinged along axial 402. The weight of the roller 40 flattens the paper 10, against which the roller presses. As a variation, the roller 50 is not supported axially but is hinged at points 502. The roller 50 presses against the paper 10 at line 504.

Figure 1:
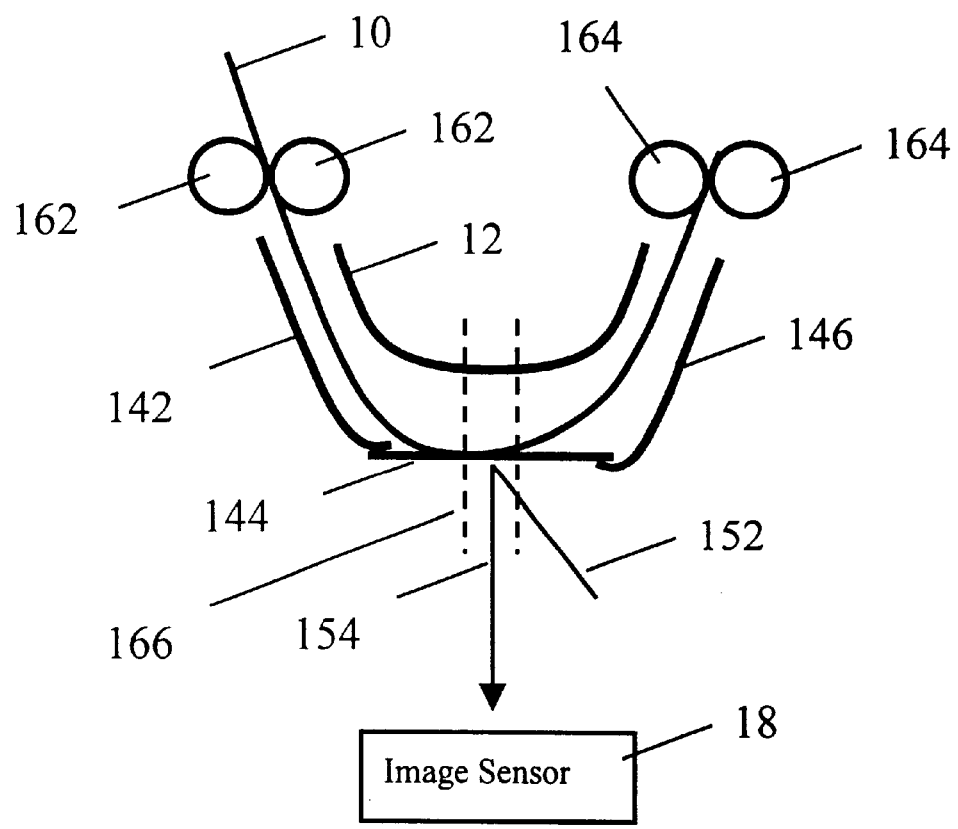
FIG. 1 shows prior art paper feeder design.
Figure 2:
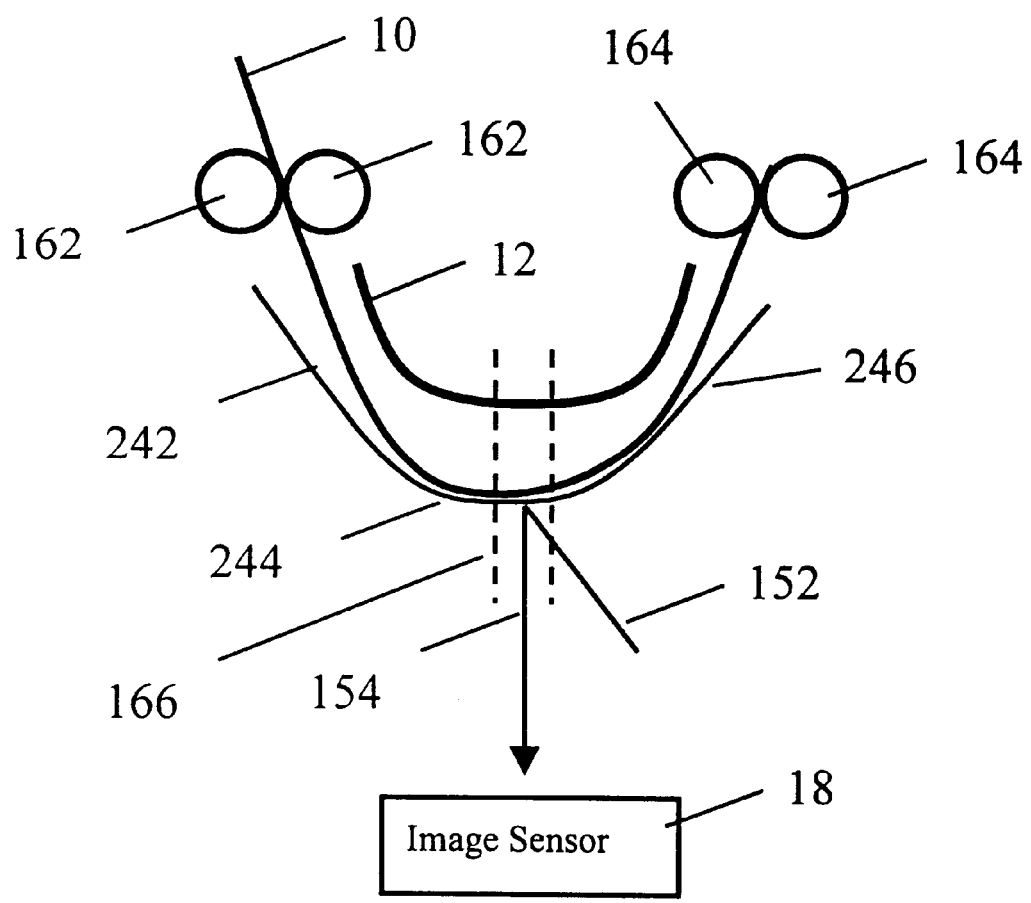
FIG. 2 shows another prior art paper feeder design.
Figure 3:
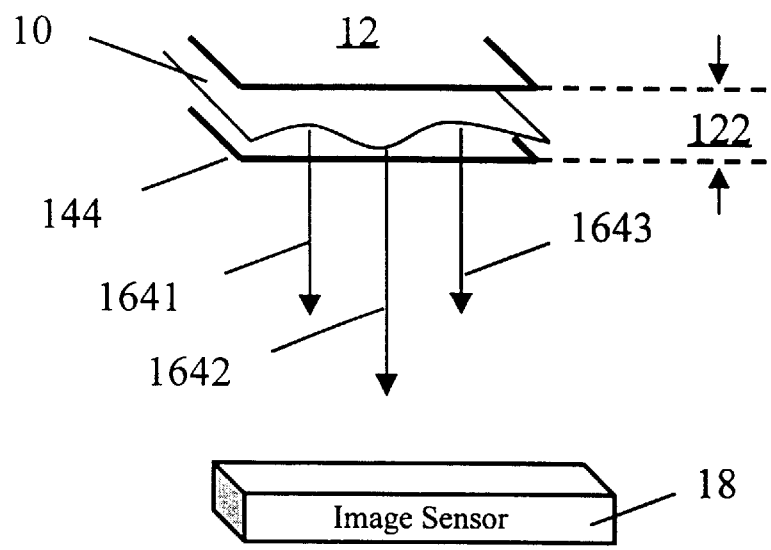
FIG. 3 shows a paper warped in a lateral direction
Figure 4:
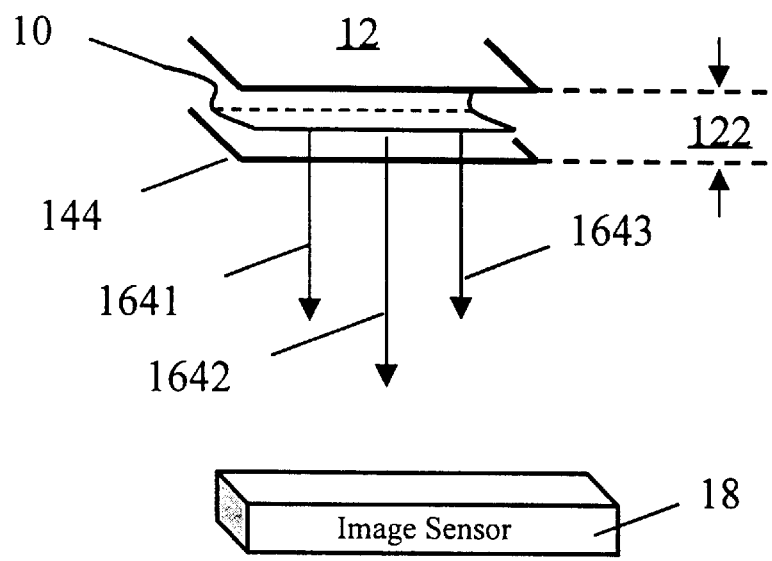
FIG. 4 shows a paper warped in a longitudinal direction.
Figure 8:
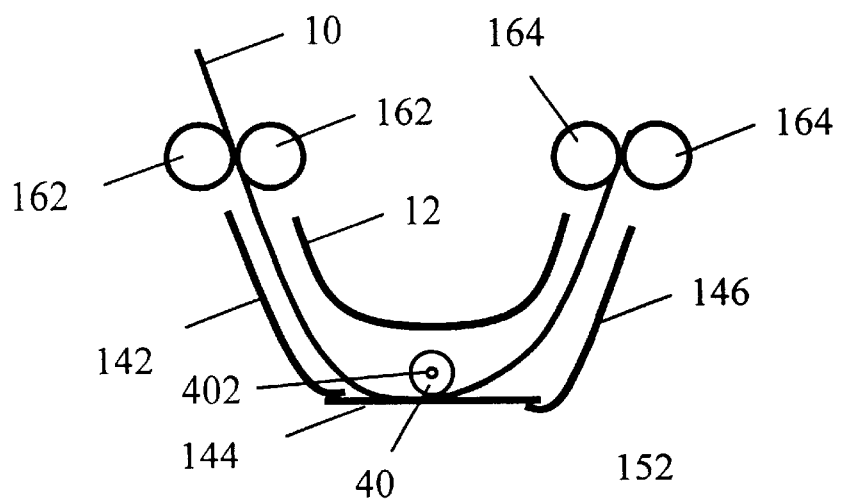
FIG. 8 shows a short arm roller design of the present invention.

FIG. 8 shows the cross-sectional view of the short arm roller 40 shown in FIG. 7. The structure of FIG. 1 is modified with the additional of the pressure roller 40. The ends of the roller 40 is axially supported on the frame of the paper feeder.

Figure 9:
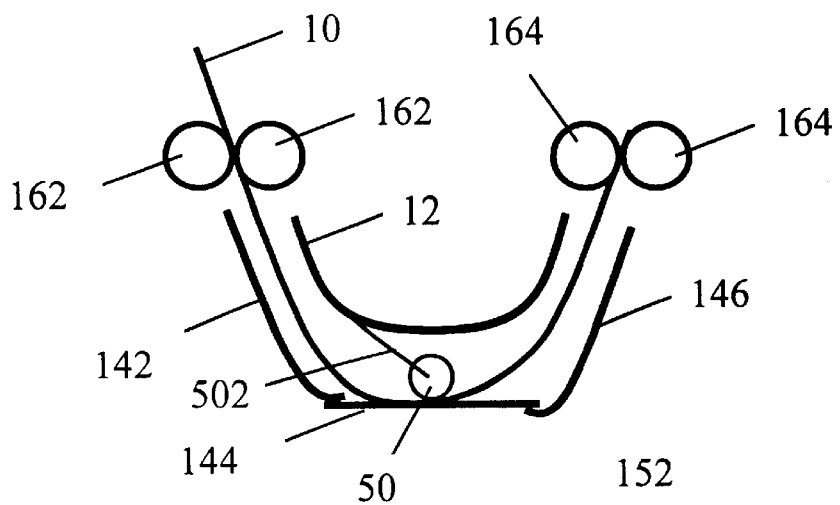
FIG. 9 shows a long arm roller design of the present invention.

FIG. 9 shows the cross-sectional view of the long arm roller 50 shown in FIG. 7. The roller is supported at the two ends by two long arms 502 which are attached to the upper guide plate 12.

Figure 10:
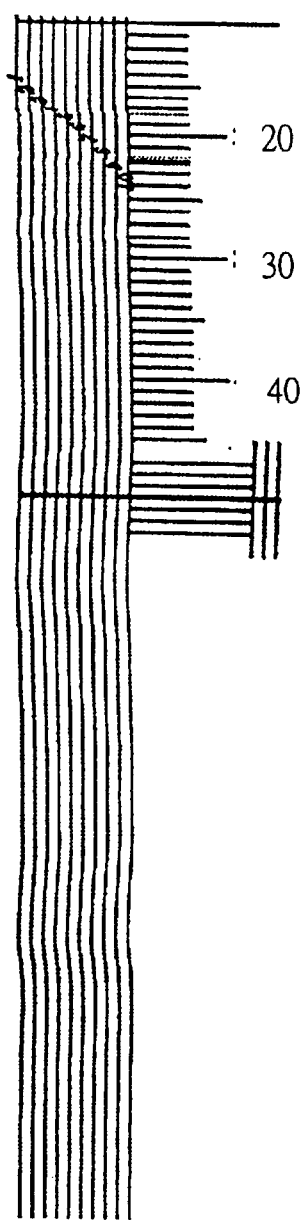
FIG. 10 shows a measurement of the distortion due to paper warping.
Figure 11:
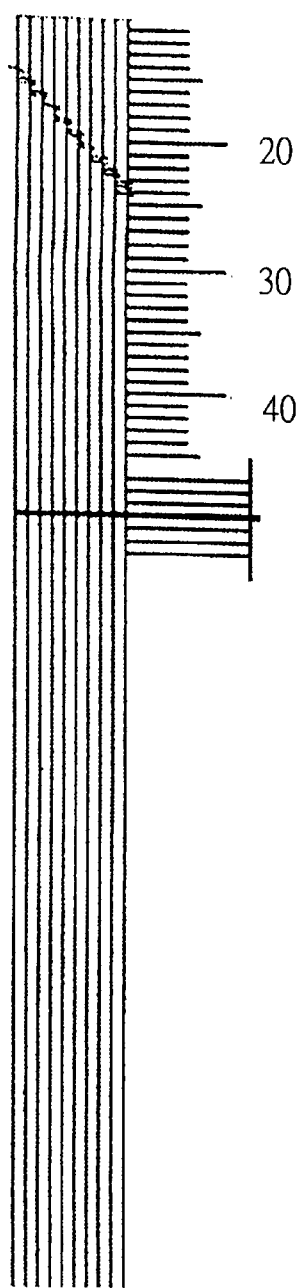
FIG. 11 shows the measurement of the with the present invention.

FIG. 10 shows a measurement of the unevenness of a scanned lines along a vertical direction of the typical scanner. Note that the deviations measure two divisions FIG. 11 shows the measurement using the novel paper feeding using the present invention. Note that the vertical lines are uniformly straight.

While the preferred embodiment of the invention has been described, it will be apparent to those skilled in the art that various modifications may be made in the embodiments for the paper feeder without departing from the spirit of the present invention. Such modifications are all within the scope of this invention.

What is claimed is:

1. A paper feeder for a scanner for feeding a sheet of paper to be scanned, comprising:

a trailing set of rollers for feeding said sheet of paper;

a leading set of rollers for conveying said sheet of paper;

a conduit between said trailing and leading rollers through which said sheet of paper is fed, said conduit having an upper guide plate and a lower guide plate, said lower guide plate having a transparent window for light transmission to said sheet of paper;

a light ray incident on said sheet of paper and reflected to an image sensor; and a flat spring with one end attached to said upper guide-plate to exert pressure to flatten the sheet of paper at a line where said light ray is incident on said sheet of paper.

2. A paper feeder as described in claim 1, wherein said flat spring has another end pressing against said sheet of paper at the line where said light is incident on said sheet of paper.

3. A paper feeder as described in claim 1, wherein said flat spring is folded along a horizontal line so a large flat area of the spring presses against the line where said light ray is incident on said sheet of paper.

4. A paper feeder for a scanner for feeding a sheet of paper to be scanned, comprising:

a trailing set of rollers for feeding said sheet of paper;

a leading set of rollers for conveying said sheet of paper;

a conduit between said trailing and leading rollers through which said sheet of paper is fed, said conduit having an upper guide plate and a lower guide plate, said lower guide plate having a transparent window for light transmission to said sheet of paper;

a light ray incident on said sheet of paper and reflected to an image sensor; and a roller hinged on two long arms attached to said upper guide plate, the roller for pressing against a line where said light ray is incident on said sheet of paper to flatten the sheet of paper.

* * * * *